: 2,928,875

ISOPROPYLHYDRAZINE DERIVATIVES

William B. Martin and Leo R. Swett, Waukegan, Ill., assignors to Abbott Laboratories, North Chicago, Ill., a corporation of Illinois No Drawing. Application December 11, 1958
Serial No. 779,543

6 Claims. (Cl. 260—557)

The present invention is concerned with novel compounds corresponding to the formula

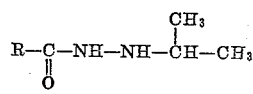

In this and succeeding formulas, R represents cycloalkyl or alkyl substituted cycloalkyl wherein the cycloalkyl ring contains from 3 to 6 carbon atoms, inclusive, and the alkyl substituents are methyl, ethyl, propyl or butyl. These new compounds are crystalline solids somewhat soluble in common organic solvents but substantially insoluble in water. They are extremely valuable as monoamine oxidase inhibitors and may be employed in the treatment of psychotic illnesses. In representative operations, substantially complete inhibition of monoamine oxidase was obtained in mice when 1-cyclobutanecarbonyl-2-isopropylhydrazine was administered orally at a dosage of approximately 20 mg. per kg. of body weight.

The prepearation of the compounds of this invention may be conveniently illustrated by the following series of reactions:

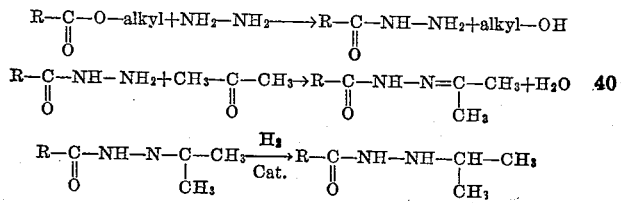

Step I of the method is carried out by heating a mixture of equimolar amounts of the reactants (and preferably an excess of hydrazine) in the absence of a solvent but conveniently in the presence of an inert organic solvent, such as ethanol, at the boiling temperature and under reflux for a sufficient period of time to complete the reaction. The reaction mixture is then distilled to remove low boiling constituents and the residue recrystallized from a suitable solvent such as benzene.

In Step II of the method, the hydrazide prepared in Step I is heated with a sufficient quantity of acetone (preferably an excess) at the boiling temperature of the reaction mixture and under reflux for a period of time to complete the reaction. The unreacted acetone and water of reaction are then removed by distillation and the residue recrystallized from a suitable medium such as acetone or ether.

The third step of the method consists in reacting the unsaturated isopropylidenehydrazide prepared in the preceding step with a sufficient quantity of hydrogen in the presence of a solvent such as ethanol and a catalyst as for example, platinum on carbon to saturate the double bond. Upon completion of the reaction, the solvent and catalyst are removed in a conventional manner and the residue purified by recrystallization from various organic solvents such as alcohol or petroleum ether.

Details of the method of preparation of the new compounds are fully described in the following examples which are merely illustrative of the invention rather than limitative.

EXAMPLE I

*1-(2-methylcyclopropanecarbonyl)-2-isopropylhydrazine*

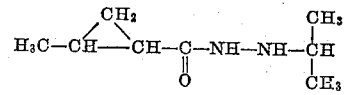

A mixture of 100 grams (0.78 mole) of ethyl 2-methylcyclopropanecarboxylate and 100 grams (2.0 moles) of hydrazine monohydrate was heated at the boiling temperature and under reflux for 18 hours. The reaction mixture was then partially distilled to remove low boiling constituents and the residue recrystallized from benzene. As a result of these operations, there was obtained a 2-methylcyclopropanecarbonylhydrazine product as a crystalline solid which melted at 88°–90° C. A mixture of 92 grams (0.78 mole) of the above product and 100 ml. of acetone was heated at the boiling temperature and under reflux for 3 hours. The excess acetone was then removed by distillation and the residue recrystallized from acetone to obtain a 1-(2-methylcyclopropanecarbonyl)-2-isopropylidenehydrazine product as a white solid which melted at 107°–108° C. About 115 grams (0.75 mole) of this product was dissolved in ethanol and reacted with hydrogen in the presence of a platinum on carbon catalyst until the absorption of hydrogen ceased. The ethanol and catalyst were thereafter removed and the residue recrystallized from petroleum ether boiling at 60°–70° C. to obtain 1-(2-methylcyclopropanecarbonyl)-2-isopropylhydrazine as a white crystalline solid melting at 73°–74° C. The identity of the final product was further established by elemental analysis.

EXAMPLE II

*1-cyclobutanecarbonyl-2-isopropylhydrazine*

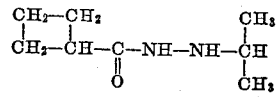

A mixture of 26 grams (0.20 mole) of ethyl cyclobutanecarboxylate, 20 grams (0.40 mole) of hydrazine monohydrate and 75 ml. of absolute ethanol was refluxed on a steam bath for 3.5 hours. The reaction mixture was then partially distilled to remove low boiling constituents and the residue which solidified upon colling was recrystallized from a benzene-petroleum ether mixture to obtain cyclobutanecarbonylhydrazine as a white solid which melted at 79°–80° C. Twenty grams (0.20 mole) of the above prepared hydrazine intermediate and 100 ml. of acetone were thereafter refluxed for 3.5 hours. Upon removal of the excess acetone, the residue solidified and was recrystallized from acetone to obtain 1-cyclobutanecarbonyl-2-isopropylidenehydrazine as a crystalline solid melting at 100°–101° C. A portion of the isopropylidenehydrazine intermediate thus prepared (20.5 grams, 0.13 mole) was hydrogenated in a conventional manner using ethanol as a solvent and platinum oxide as a catalyst. The 1-cyclobutanecarbonyl-2-isopropylhydrazine thus obtained was recrystallized from ethanol and found to melt at 119°–120° C. Elemental analysis confirmed the identity of the final product.

EXAMPLE III

*1-(3-methylcyclobutanecarbonyl)-2-isopropylhydrazine*

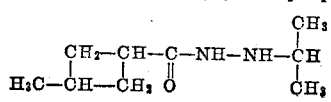

18.2 grams (0.14 mole) of methyl 3-methylcyclobutanecarboxylate and 7.1 grams (0.14 mole) of hydrazine monohydrate was dissolved in 50 ml. of absolute ethanol and the resulting mixture refluxed for 18 hours. Upon removal of the ethanol, the residue was washed with ether, filtered and dried to obtain the intermediate 3-methylcyclobutanecarbonylhydrazine as a white solid melting at 94°–95° C. The hydrazine product in the amount of 10.9 grams (0.85 mole) was then refluxed with 150 ml. of acetone for 20 hours. The excess acetone was removed and the residue recrystallized from acetone to obtain 1-(3-methylcyclobutanecarbonyl) - 2 - isopropylidenehydrazine as a crystalline solid having a melting point of 113°–114° C. The unsaturated hydrazine product thus prepared in the amount of 10 grams (0.06 mole) was dissolved in ethanol and hydrogenated in the presence of a platinum oxide catalyst by conventional means. As a result of these operations, there was obtained 1-(3-methylcyclobutanecarbonyl)-2-isopropylhydrazine as a crystalline solid which after recrystallization from alcohol melted at 65°–66° C. This product was further identified by elemental analysis which corresponded to the calculated elemental values.

EXAMPLE IV

*1-cyclohexanecarbonyl-2-isopropylhydrazine*

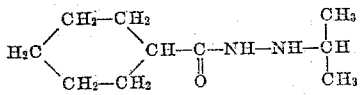

A mixture of 68.8 grams (0.44 mole) of ethyl cyclohexanecarboxylate, 25.1 grams (0.40 mole) of hydrazine monohydrate and 120 ml. of absolute ethanol was refluxed for 25 hours. The ethanol was then removed and the residue recrystallized from ethanol to obtain cyclohexanecarbonylhydrazine as a white solid which melted at 156°–156.5° C. This product in the amount of 22.3 grams (0.156 mole) was mixed with 150 ml. of acetone and the resulting mixture heated at the boiling temperature and under reflux for 5 hours. The excess acetone was thereafter removed by distillation and the solid residue recrystallized from ether to obtain 1-cyclohexanecarbonyl-2-isopropylidenehydrazine as a white solid melting at 125°–126° C. Treatment of the latter product with hydrogen in the presence of a platinum on carbon catalyst resulted in the formation of the desired 1-cyclohexanecarbonyl-2-isopropylhydrazine as a crystalline solid which after recrystallization from alcohol melted at 124°–125° C.

EXAMPLE V

*1-cyclopentanecarbonyl-2-isopropylhydrazine*

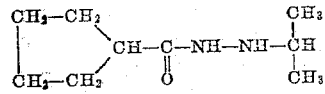

A mixture of 61.8 grams (0.48 mole) of methyl cyclopentanecarboxylate, 24.1 grams (0.48 mole) of hydrazine monohydrate and 150 ml. of ethyl alcohol was heated at the boiling temperature and under reflux for 5 hours. The reaction mixture was then partially distilled to remove low boiling constituents and the residue washed with ether, filtered and dried to obtain the intermediate cyclopentanecarbonylhydrazine as a white solid melting at 117°–118° C. The hydrazine product in the amount of 20.7 grams (0.16 mole) was then refluxed with 250 ml. of acetone for 18 hours. The excess acetone was removed and the residue recrystallized from acetone to obtain 1-cyclopentanecarbonyl - 2 - isopropylidenehydrazine as a crystalline solid having a melting point of 115°–116° C.

Treatment of the latter product with hydrogen in the presence of a platinum oxide catalyst resulted in the formation of the desired 1-cyclopentanecarbonyl-2-isopropylhydrazine as a crystalline solid which after recrystallization from alcohol melted at 82°–83° C.

In a manner similar to that set forth in the foregoing examples, other isopropylhydrazine derivatives are prepared of which the following are representative:

1-cyclopropanecarbonyl-2-isopropylhydrazine by the reaction of ethyl cyclopropanecarboxylate with hydrazine and subsequent reaction with acetone and hydrogen, respectively.

1 - (3-methylcyclopentanecarbonyl)-2-isopropylhydrazine by the reaction of methyl 3-methylcyclopentanecarboxylate with hydrazine and subsequent reaction with acetone and hydrogen, respectively.

1 - (4-methylcyclohexanecarbonyl)-2-isopropylhydrazine by the reaction of ethyl 4-methylcyclohexanecarboxylate with hydrazine and subsequent reaction with acetone and hydrogen, respectively.

What is claimed is:

1. A compound corresponding to the formula

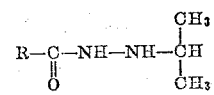

wherein R represents a member of the group consisting of cycloalkyl and methyl substituted cycloalkyl wherein the cycloalkyl group contains from 3 to 6 carbon atoms, inclusive.

2. 1 - (2 - methylcyclopropanecarbonyl)-2-isopropylhydrazine.

3. 1-cyclobutanecarbonyl-2-isopropylhydrazine.

4. 1 - (3 - methylcyclobutanecarbonyl)-2-isopropylhydrazine.

5. 1-cyclohexanecarbonyl-2-isopropylhydrazine.

6. 1-cyclopentanecarbonyl-2-isopropylhydrazine.

References Cited in the file of this patent

Yale et al.: J.A.C.S., vol. 75 (1953), pp. 1933–42.